United States Patent [19]

Forquer et al.

[11] Patent Number: 4,491,915
[45] Date of Patent: Jan. 1, 1985

[54] MULTIPROCESSOR-MEMORY DATA TRANSFER NETWORK

[75] Inventors: Timothy J. Forquer, Haddonfield; Hungwen Li, Cherry Hill, both of N.J.

[73] Assignee: RCA Corporation, New York, N.Y.

[21] Appl. No.: 445,522

[22] Filed: Nov. 30, 1982

[51] Int. Cl.³ .............................................. G06F 15/16
[52] U.S. Cl. .................................................. 364/200
[58] Field of Search ........................ 364/200 MS File

[56] References Cited

U.S. PATENT DOCUMENTS

| | | |
|---|---|---|
| 3,317,898 | 5/1967 | Hellerman . |
| 3,771,137 | 11/1973 | Barner et al. . |
| 4,151,592 | 4/1979 | Suzuki et al. . |
| 4,171,536 | 10/1979 | Heuer et al. . |
| 4,209,840 | 6/1980 | Berardi et al. ........................ 364/200 |
| 4,214,305 | 7/1980 | Tokita et al. . |

FOREIGN PATENT DOCUMENTS 773457 4/1957 United Kingdom .

OTHER PUBLICATIONS

"The Memory System of a High-Performance Personal Computer" by D. W. Clark, B. W. Lampson and K. A. Pier, *IEEE Transactions on Computers*, vol. C-30, No. 10, Oct. 1981.
"Semiconductor Memories: Density and Diversity" by T. Williams, Computer Design, Aug. 1984, pp. 105-116.

Primary Examiner—Raulfe B. Zache
Attorney, Agent, or Firm—J. S. Tripoli; R. L. Troike; R. E. Smiley

[57] ABSTRACT

A data transfer system for transferring words of data in either direction between a main memory and N processors includes N registers, each of N words (or multiples of N words) capacity. Each register is connected to its associated processor to transmit data words serially at a given rate therebetween and connected to the memory to transmit N words (or multiples of N words) in parallel therebetween in succession at a rate which allows the uninterrupted serial word transfer at rate X.

16 Claims, 3 Drawing Figures

MULTIPROCESSOR-MEMORY DATA TRANSFER NETWORK

This invention is concerned with data systems involving multiple processors with a commonly accessible memory and in particular, to such systems in which there is simultaneous communication desired between at least two of the processors and the memory.

BACKGROUND OF THE INVENTION

Many data systems now involve the use of more than one data processor and a common memory which is desirably simultaneously accessed by more than one processor. Such simultaneous access is not, however, possible. The processors are said to be in contention for memory. Therefore the processors must wait their turn. If an earlier serviced processor requires a transfer in or out of a large amount of data, the wait for a subsequent processor will be intolerably long. The goal is a contention-free system wherein each processor at any time can have access to the memory.

FIG. 1 illustrates a prior art step toward a contention-free system. In FIG. 1 there are, by way of example, four data buses (each of 32 wires in a 32 bit system) forming a data transfer network, four processors each coupled to a different data bus and four memories, each switchably connected to all the data buses. An open circle on a bus represents a 32 pole single throw data switch controlled by control means not shown. In operation of the exemplary system, each processor is typically connected with an associated memory, but there are still times when two or more processors simultaneously want to connect with one memory. Further, although the number 32 is a realistic number of bits a realistic system may have 8 or more processors, memories and data buses. Thus the data transfer network involves at least $8 \times 8 = 64$ 32 pole switches and at least $8 \times 8 \times 32 = 2048$ connections making it a very complex device. In spite of the complexity, the goal of the contention-free memory access is still not met as more than one processor may want information from the same memory at the same time.

Bit sliced memory arrangements are known. In a bit sliced memory arrangement there are as many memories as there are bits in a word. Thus in a system involving a 32-bit word there are 32 memories each coupled to every processor. Such a system requires a separate control bus to transfer address and control signals between the various processors and the various memories. The bit slice system involves less complexity than the illustrated prior art system of FIG. 1 but is worse in the sense that only one processor can connect with the memory at one time.

SUMMARY OF THE INVENTION

A system for concurrently transferring words of data between a data storage memory and a plurality N of data processors, comprises in combination means producing timed control signals and N buffer means. Each buffer means is coupled between a different one of the processors and the memory for temporarily storing a number M of words, M being proportional to N. Each buffer means is responsive to the control signals for transferring the temporarily stored words serially between itself and its associated one of the processors at a transfer rate X and for transferring in parallel M of the words at a time between itself and the memory, the transfer between the N buffer means and memory occurring in succession at a rate such that the serial transferring occurs uninterruptedly at the rate X.

DETAILED DESCRIPTION OF THE PREFERRED EMBODIMENT

Figure 1:
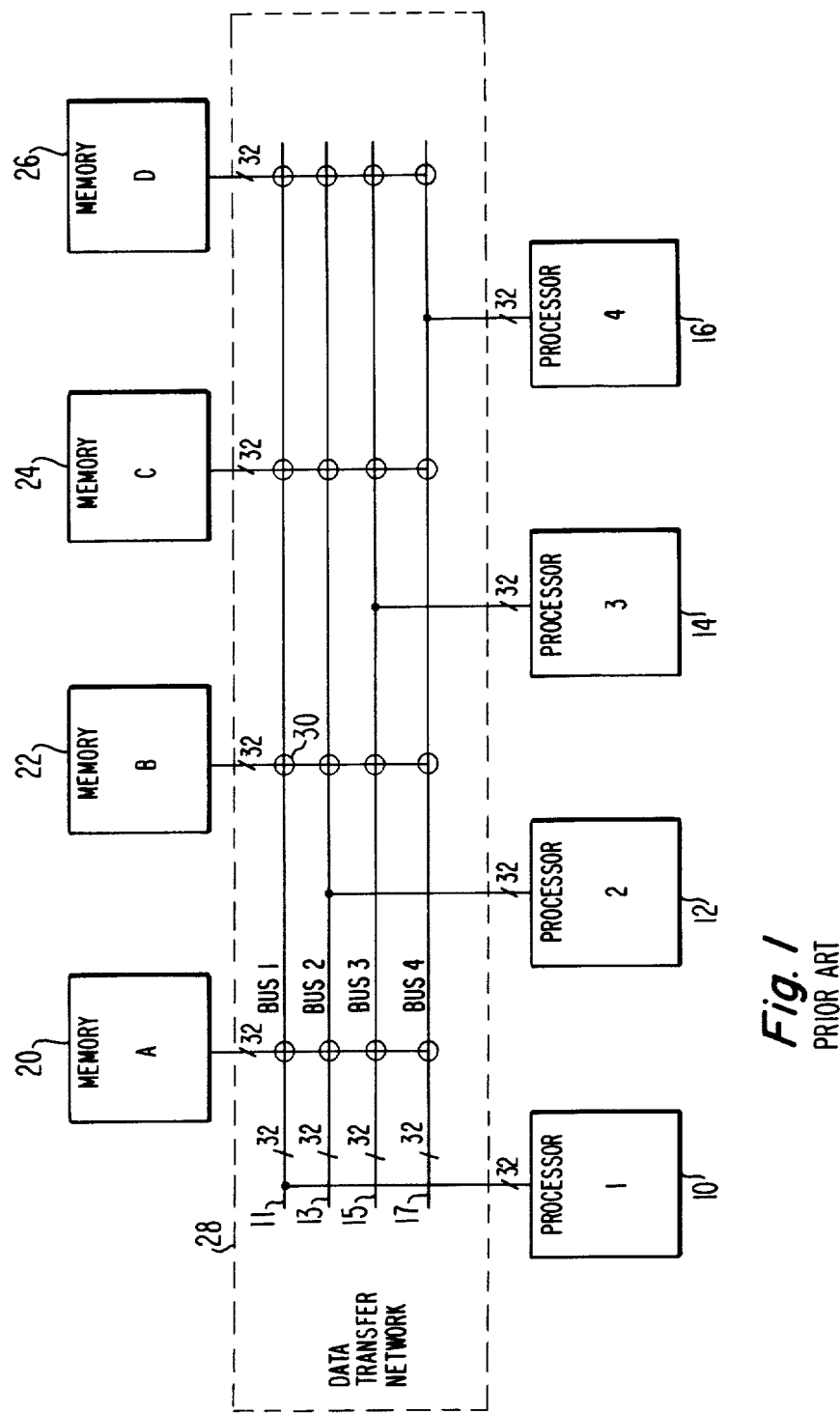
FIG. 1 is a multi-memory multiprocessor system in block diagram form in accordance with the prior art.

Referring first to the prior art system of FIG. 1 the system involves by way of example, four processors, 10, 12, 14 and 16, four 32-bit memories 20, 22, 24, and 26 and a data transfer network 28. Data transfer network 28 comprises four bus sets 11, 13, 15 and 17 each connected to an associated processor 10, 12, 14 and 16, respectively. Each bus set is switchably connected to each memory. Switches are schematically represented by open circles such as 30, there being 16 switches such as switch 30 illustrated in FIG. 1. For an exemplary 32-bit per data word system each bus set actually comprises 32 wires and switch 30 and other similar switches are actually 32-bit single-position switches. The switch control means are not shown but are of conventional design under control of the various processors. The slashes with associated numbers at various points in FIG. 1 and in FIG. 2 to be described hereinafter indicates the number of signal wires represented by the line through which the slash mark is passed. In FIG. 1 the various slashed lines all represent 32 data wires. Other ground wires, control wires, and so on are in addition to the 32 wires.

In operation each processor is coupled to a memory of its choice by the setting of appropriate switches in data transfer network 28. Transfer is in either direction between a processor and a memory to which it is connected by switches such as 30. Transfer is bit parallel, word serial. That is, a first word of 32 bits is transferred from a memory to a processor or vice versa, followed by a second 32-bit word, etc. So long as two processors do not want to communicate with the same memory at the same time, each processor can operate at its maximum speed. When two processors do want to communicate with the same memory, one processor must wait until data transfer between the desired memory and the other processor is complete. In the case of large blocks of data, the wait may be long and, in some applications, intolerably long.

Figure 2:
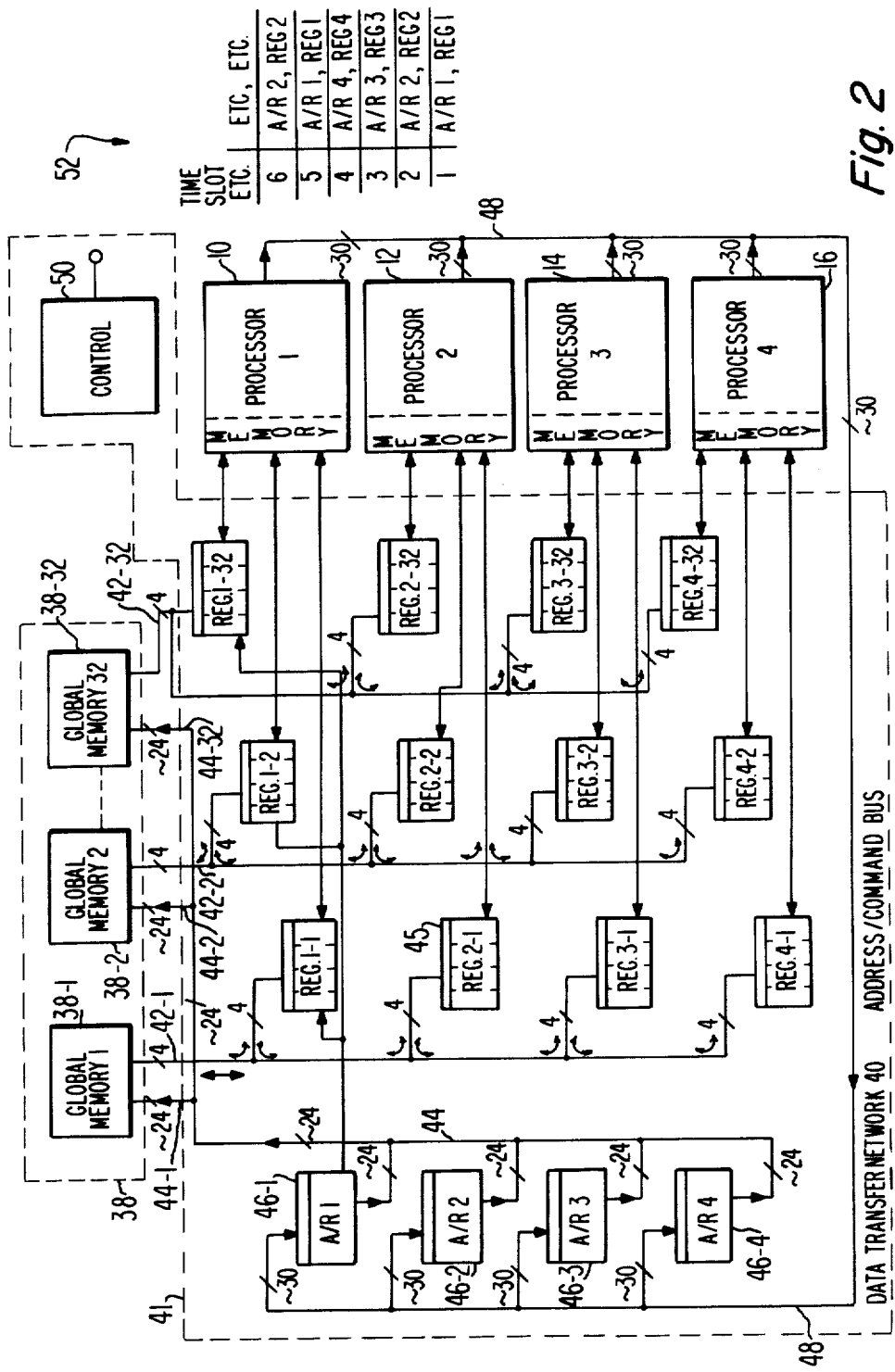
FIG. 2 is a multi-memory multiprocessor system in block diagram form in accordance with the present invention.

The system of FIG. 2 which is in accordance with the preferred embodiment of the present invention, while not totally contention-free, is substantially more contention-free than the circuit of FIG. 1 as will be hereinafter described. In FIG. 2, four processors 10, 12, 14 and 16, similar to those in prior art FIG. 1, are coupled to global memories 38-1, 38-2...38-32 (there being only three such memories illustrated) via a data transfer network 40 within dashed block 41. As with FIG. 1, the number of processors (4), the number of bits per word (32), number of memories (1) subdivided in 32 one-bit of multiple word memories, etc. is only by way of example. In particular, eight processors might be more typical of real systems but the number four serves to illustrate the principles of the invention. Each processor such as processor 10 may comprise a standard microprocessor such as available from Fairchild as Model 1750, Digital Equipment Corp. as Model PDP-11/23 or Motorola as Model 68000. In the alternative one or more of the processors may be a special purpose device that uses data from the global memory and/or generates data destined for the global memory.

Each processor, by way of example, utilizes 32-bit words; that is, each word comprises 32 bits. As indicated in FIG. 2, each processor also comprises a memory which typically stores approximately 64,000 (64K) 32-bit words but which could store fewer or many more than 64K. Global memory 38 comprises 32 one-bit by multiple word solid state memories such as available from Intel. Each part of global memory 38 such as memory 38-1, 38-2, etc. stores only one bit of each of multiple words. In a 32-bit system, 32 such memories are required and each may, by way of example, store one bit of each of at least N×64K words where N is equal to the number of processors. Data is transferred to and from memory 38 on data buses such as 42-1, 42-2 and 42-32 while control (read/write) and address information is passed to memory 38 on bus 44 and branch buses such as 44-1, 44-2 and 44-32.

Data transfer network 40 includes an N bit data register or data buffer associated with each bit of each processor where N is typically equal to or a multiple of the number of processors in the system. Thus processor 10, also termed processor 1, has connected to its memory 32 4-bit registers, three of which, register 1-1, register 1-2, and register 1-32, are illustrated. The data bus of each global memory is connected to four data registers. For example, global memory 38-2 is connected via data bus 42-2 to register 1-2, register 2-2, register 3-2 and register 4-2. It will be noted that each register is identified by the form register X-Y, where X is the number of the processor to which the register is connected, and Y is the number of the bit position of the global memory to which the register is connected. For example, register 3-2 is connected to processor 3, also legended processor 14, and to global memory 38-2. The registers are arranged such that bit serial data transfer occurs between each register and its associated processor and bit parallel transfer occurs between the register and global memory.

Because each of the data buses 42-X (X=1, 2, 3, 4) is connected to a plurality of registers, each register includes a gating means illustrated as an elongated horizontal box such as 45 connected to its data bus. The purpose of the gating means is to allow data transfer between memory and the registers associated with only one processor at a time as will be described more fully hereinafter.

Data transfer network 40 also includes four address registers (A/R), 46-1, 46-2, 46-3, and 46-4, there being one address register for each processor. That is, A/R 46-1 is associated with processor 1, A/R 46-2 is associated with processor 2, etc. Each address register typically holds 30 bits of memory address and control information. Address/command bus 48 connects between all processors 10, 12, 14, and 16 and all address registers 46-1 through 46-4. Each A/R includes a gating means illustrated as an elongated horizontal box similar to those included in the data registers for the same purpose. Via bus 48, processors 10, 12, 14 and 16 in turn transmit information to the associated address register concerning starting and ending addresses in memory 38 of data to be transferred between the processor and memory 38 and the direction of transfer, into memory 38 or into a processor.

Each A/R is coupled to the data registers associated with the processor which it serves. That is, A/R 1 is coupled to registers 1-1, 1-2 . . . 1-32 associated with processor 1. The other address registers are similarly coupled to their associated registers but are not illustrated for sake of drawing clarity. The purpose of the A/R-data register connection is for controlling the data registers for the direction of data transfer, into a processor or out from a processor. Each A/R includes a counter or equivalent structure for incrementing the memory addresses stored therein each time the A/R is accessed as described below until the ending address stored therein is reached.

A control means 50 is coupled to each of the processors 10-16, memory 38, A/R 46-1 through 46-4 and registers 1-1, 1-2 . . . 4-32 in FIG. 2 to provide control and timing information thereto. The interconnections between means 50 and the other elements are not shown in FIG. 2 for reasons of drawing clarity. Among other things, means 50 produces signals for controlling the time duration and rate at which the various registers are enabled to receive or transmit data.

As illustrated in timing diagram 52, the registers are enabled serially, first the register 1 group, i.e., registers 1-1 through 1-32 and address register 1, are enabled, then the register 2 group, i.e., registers 2-1 through 2-32 and address register 2, are enabled, etc. A typical rate (1÷time slot-to-slot spacing) is 10 megahertz (MHz). During the same time slot that a particular set of data registers is enabled, the associated address register is enabled to accept new commands, if any, from its associated processor or to address the memory at an address determined by the counter setting in the address register to cause it to write into or read from the addressed location. Finally in each time slot each register (for which data transfer by an associated processor is desired) is enabled to transfer one bit of data between itself and its associated processor.

Figure 3:
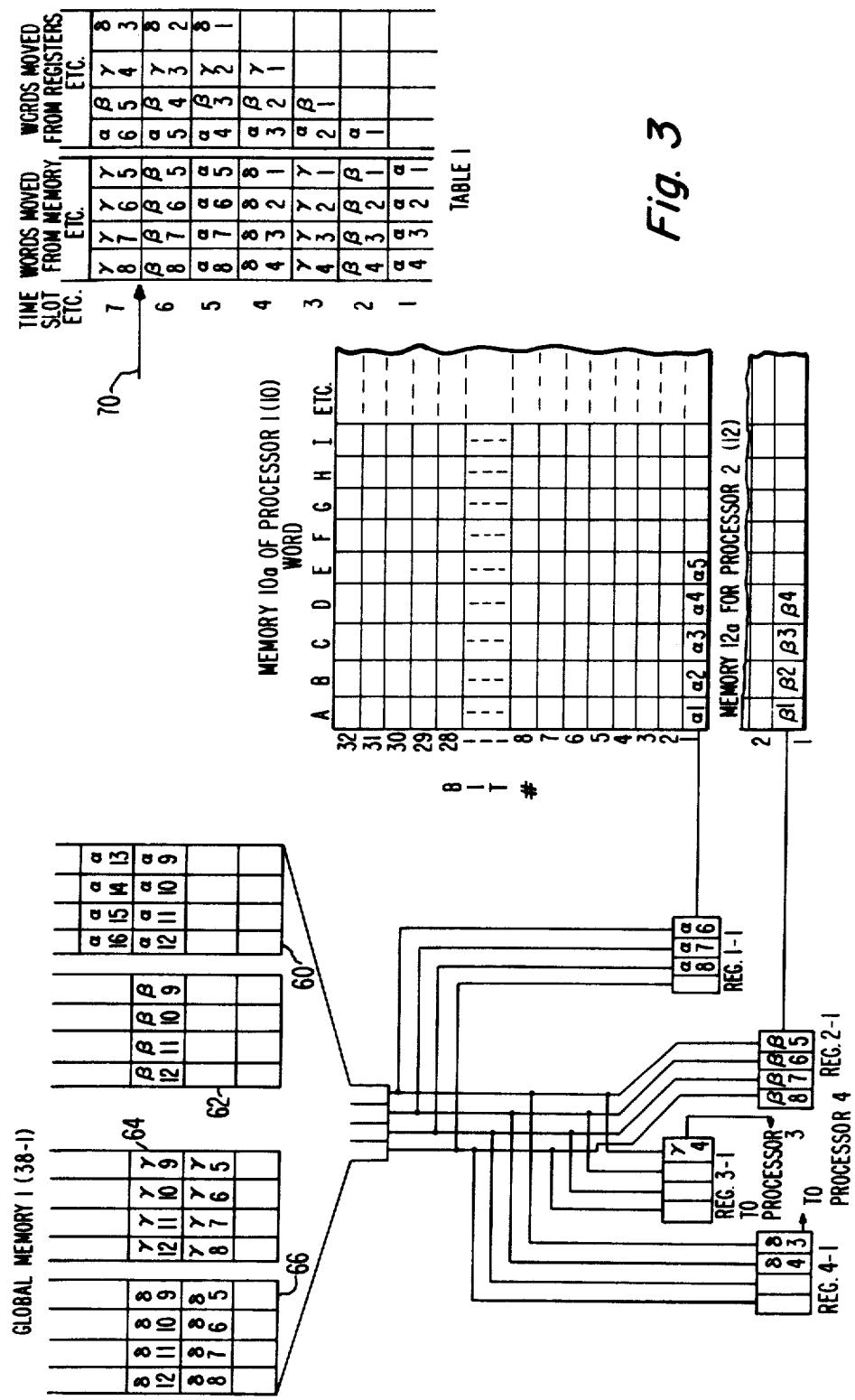
FIG. 3 is a portion of the system of FIG. 2 illustrating in greater detail than in FIG. 2 memory contents of an exemplary processor memory and an exemplary global memory.

Operation of the system of FIG. 2 will be understood by reference also to FIG. 3 which is a combination hardware and quasi timing diagram. Before discussing the detailed operation of FIG. 2, the system theory of operation will be discusssed. The purpose of the system is for each of the multiple processors 1, 2, 3 and 4, (10, 12, 14 and 16) to seemingly have exclusive use of the system global memory 38 for transfer of data from the processor to the memory or from the memory to the processor.

For its practical operation, the system requires that large blocks of data be transferred. This is so because the time taken for a processor to transfer to its associated address register 46, the start and ending addresses in global memory of data desired to be transferred and the direction of the transfer. Once that "housekeeping" is taken care of and assuming that all processors want simultaneous service, a worst case condition, actual data transfer begins.

It will be assumed in the discussion that follows that transfer is from global memory 38 to the various processors 1 through 4 but it will be understood that data transfer could also be from the processors to the global memory or a combination, that is, transfer from global memory to some processors and a transfer from other processors to global memory.

During a first time slot under timing control of control 50, a block of four words is transferred in parallel from an address in global memory 38 determined by an address stored in the counter of A/R 1 to register 1 (register 1-1, register 1-2 . . . register 1-32) and the A/R 1 counter is incremented to the address of a subsequent block of four words. The number of words transferred in parallel is equivalent to or a multiple of the number of processors in the system. If the global memory is able to operate at the same data transfer rate, say rate X, as the processors, a number of words equal to the number of processors is transferred in parallel. If the global memory operates at the processor rate ÷Y, then Y times the number of processor words are transferred in parallel. It will be hereinafter assumed that the global memory 38 data transfer rate and processor data transfer rate are both at rate X. For example, rate X may be 1 MHz.

During a successive second time slot, a second group of four words destined for processor 2 is transferred from global memory 38 at a location addressed by A/R 2 to register 2 (register 2-1, register 2-2 . . . register 2-32). During the same time slot, the first word from register 1 is transferred to the memory of processor 1.

During a successive third time slot, data is transferred from global memory 38 at a location addressed by A/R 3 to register 3 (for register 3-1, register 3-2 . . . register 3-32). During that time slot the second of the four words in register 1 is transferred to the memory of processor 1 and the first of the four words in register 2 is transferred to the memory of processor 2.

During a successive fourth time slot a block of four words is transferred from global memory 38 at a location addressed by A/R 4 to register 4 (register 4-1, register 4-2...register 4-32), the third of the four words in register 1 is transferred to the memory of processor 1, the second of the four words of register 2 is transferred to the memory of processor 2, and the first of the four words in register 3 is transferred to the memory of processor 3.

During a successive fifth time slot a second group of four words from global memory 38 is transferred to register 1 as the fourth word in register 1 from the first group of four words transferred thereto is transferred to the memory of processor 1. Transfer of a word in each of the other registers to its associated processor memory occurs during the fifth time slot.

Similar action to that described above occurs in subsequent time slots until the data transfer requirements of the various processors is satisfied.

The important point to understand is that once data transfer begins each processor is receiving data as fast as its circuitry permits. Each processor therefore appears to have the undivided attention of the global memory and therefore in effect all processors are being served at once even though the global memory 38 can read out from or write into one memory address (containing four words) in one time slot.

Now with regard to a detailed description of the operation, FIG. 3 illustrates schematically, in expanded detail relative to FIG. 2, global memory 1, (global memory 38-1) the one containing the bit 1 (of 32) data. The other 31 global memories are identical. In four areas of the memory, 60, 62, 64 and 66 respectively, each one storing many words, is α data being requested by processor 1, β data being requested by processor 2, γ data being requested by processor 3 and δ data being requested by processor 4. It will be understood that two or more processors may want data from the same memory locations. Thus, for example, memory areas 60 and 62 may be the same or at least overlap. Global memory 1 is coupled in parallel to each of data registers X−1 where the 1 corresponds to global memory 1 and the value of X corresponds to the particular processor 1, 2, 3 or 4 to which the data register is connected.

Register gating at each of the registers is not illustrated nor is the interconnection between control 50 (FIG. 1) and the data registered nor is the interconnection between the address registers (FIG. 2) and data systems, but these are of conventional design and allows transfer of data between global memory 38 and only registers associated with one processor at a time.

The global memory is arranged such that a group of four successive words is functionally transferred together as a unit. The memory 10a of processor 1 is illustrated in expanded detail relative to the illustration in FIG. 2. Other processor memories are identical to the processor 1 memory. Each processor memory comprises 32-bit words designated A, B, C . . . , I . . . Although not illustrated, bit 2 of memory 10a is connected to receive data from register 1-2, bit 3 is connected to receive data from register 1-3, etc.

In the upper right corner of FIG. 3 is a TABLE, TABLE 1, illustrating what words are being transferred from memory 38 and from registers during successive time slots. Thus in time slot 1, global memory 38 is addressed by A/R 1 (FIG. 2) to transfer α words 1, 2, 3 and 4 from global memory area 60 and from equivalent areas of the other 31 global memories (not shown) into register 1-1 and 31 other registers 1-X (not shown). The gating of data into the proper registers and the addressing of global memory by A/R is under control of timing signals from control means 50 (FIG. 2).

During successive time slots, 2, 3, 4 etc. successive words are moved as illustrated in TABLE 1. FIG. 3 illustrates a condition at the end of time slot 6 as illustrated by arrow 70 in TABLE 1. That is, β words 5, 6, 7 and 8 have been transferred to register 2-1, word α5 has been transferred from register 1-1 to memory 10a, location E, word β4 has been transferred from register 2-1 to memory 12a of processor 2, location D. Also, although not shown, word γ3 has been transferred from register 3-1 to the memory for processor 3 and word δ2 has been transferred from register 4-1 to the memory for processor 4.

It will be noted that once words are removed from global memory locations those locations are illustrated as being blank in FIG. 3. In reality, the memory still contains the data even though it has been read out to the processor.

As described in the general description preceding this detailed description of operation, after all registers have been filled once, each processor memory is receiving data as fast as its circuitry will allow and therefore appears to have the undivided attention of global memory 38.

In contrast to the operation above described for global memory-to-processor transfers, in processor-to-global memory transfers data is transferred from a processor (e.g., processor 1) to its associated registers (e.g., register 1-X) one word per time slot until the registers are full (e.g., 4 words). Then the registers are emptied in parallel into four global memory locations determined by the addressing signals from the appropriate A/R (e.g., A/R 1) and the process repeats.

It will be realized that all the values given for the number of bits per word, number of processors, the fact that all processors want to be served concurrently, the fact that all processors want data read from memory as opposed to writing data into memory, and the fact that the processor memory speeds and global memory speeds are the same are all by way of example.

Thus the number of bits per word can be more or fewer than 32; the number of processors can be more or fewer than 4, 8 being a typical number; data can be concurrently transferred between the global memory and less than all of the processors; none, some or all the processors can be transferring data to global memory while all, some, or none of the processors are receiving data from global memory; and the global memory can operate at a slower speed than that of the processor memory. (It could operate at a faster speed but that would not be a well matched system.)

By way of example, if the processor operates at 1 MHz data transfer rate and the global memory operates at 0.5 MHz rate then each register 1-1, 1-2 . . . 2-1, 2-2. . . 4-32 would hold 8 words and 8 words would be simultaneously transferred at one time between global memory and each register. In such a case the global memory would have an 8 word buffer (not shown) to receive data in parallel of the 0.5 MHz rate and transfer data to the appropriate registers in parallel at the 1.0 MHz rate or vice versa.

The system also allows for direct processor-to-processor transfer alone or concurrently with processor-to-global memory and global memory-to-processor transfer. Thus for example, processor 1 may send command signals to A/R 1 to cause data to be transferred into registers 1-X directly from another processor (e.g., processor 2) via its registers. In such a case, the sending processor transmits four words in series to its associated registers, for example, registers 2-X in four successive time slots. Then in the proper time slot for registers 1-X, the data is transferred in parallel from registers 2-X to registers 1-X and thereafter registers 1-X empty one word per time slot into the memory for processor 1 while registers 2-X fill one word per time slot from processor 2.

Again, as with processor-to-global memory transfer, or global memory-to-processor transfer, once the initial setup is complete, each processor is transmitting data at its designed speed.

What is claimed is:

1. A system for concurrently transferring words of data between a data storage memory and a plurality N of data procesors, comprising in combination:
   means producing timed control signals; and
   N buffer means, each buffer means coupled between a different one of said processors and said memory for temporarily storing a number M of words, M being proportional to N and responsive to said control signals for transferring said words serially between itself and its associated one of said processors at a transfer rate X and for transferring, in parallel, M of said words at a time between itself and said memory, the transfer between the N buffer means and memory occurring in succession at a rate which allows uninterrupted said serial word transfer at rate X.

2. The combination as set forth in claim 1 wherein said memory is an addressable memory and further including N address storing means, each coupled between a different one of said processors and said memory, and responsive to said control signals for receiving, from its associated processor, address information for addresses in memory where words are located and responsive to said control signal for thereafter addressing said memory using stored address information to control the transfer of said words between said buffer means and memory.

3. The combination as set forth in claim 1 wherein at least one of said buffer means includes means for accepting data words from said memory and for transferring said data words to its associated one of said processors.

4. The combination as set forth in claim 1 wherein at least one of said buffer means includes means for accepting data from its associated one of said processors and for transferring data words to said memory.

5. The combination as set forth in claim 2 wherein at least one of said buffer means includes means for accepting data words from said memory and for transferring said data words to its associated one of said processors.

6. The combination as set forth in claim 2 wherein at least one of said buffer means includes means for accepting data from its associated one of said processors and for transferring data words to said memory.

7. The combination as set forth in claim 1 wherein each word is comprised of Y bits and wherein said memory comprises Y portions each storing a different bit of each of the words stored therein and wherein each buffer means comprises Y registers, each storing a different one of the Y bits of each word stored therein.

8. The combination as set forth in claim 1 wherein said buffer means are all connected to said memory by a common multiconductor bus.

9. The combination as set forth in claim 2 wherein said buffer means are all connected to said memory by a common multiconductor bus.

10. The combination as set forth in claim 3 wherein said buffer means are all connected to said memory by a common multiconductor bus.

11. The combination as set forth in claim 4 wherein said buffer means are all connected to said memory by a common multiconductor bus.

12. The combination as set forth in claim 7 wherein said buffer means are all connected to said memory by a common multiconductor bus.

13. The combination as set forth in claim 2 wherein all said address storing means are coupled to said processors by a common multiconductor bus.

14. The combination as set forth in claim 5 wherein all said address storing means are coupled to said processors by a common multiconductor bus.

15. The combination as set forth in claim 6 wherein all said address storing means are coupled to said processors by a common multiconductor bus.

16. The combination as set forth in claim 9 wherein all said address storing means are coupled to said processors by a common multiconductor bus.

* * * * *